United States Patent [19]

Miller et al.

[11] Patent Number: 5,137,952
[45] Date of Patent: Aug. 11, 1992

[54] PLASTISOL COMPOSITIONS

[75] Inventors: Henry C. Miller, Downingtown; Michael A. Bailey, Boothwyn, both of Pa.; David L. Weaver, Inman, S.C.

[73] Assignee: Sartomer Company, Inc., Exton, Pa.

[21] Appl. No.: 765,657

[22] Filed: Sep. 26, 1991

[51] Int. Cl.$^5$ .................... C08L 27/06; C08K 5/00
[52] U.S. Cl. .................... 524/140; 524/296; 524/310; 524/314; 524/385; 524/517; 525/74; 525/193; 525/207; 525/285
[58] Field of Search .......... 525/207, 193, 285, 74; 524/140

[56] References Cited

U.S. PATENT DOCUMENTS

| | | | |
|---|---|---|---|
| 4,251,618 | 2/1981 | McCartin | 430/270 |
| 4,388,363 | 6/1983 | Fountain | 428/215 |
| 4,613,639 | 9/1986 | Blum | 524/251 |
| 4,623,558 | 11/1986 | Lin | 427/44 |
| 4,722,947 | 2/1988 | Thanwalla | 522/120 |
| 4,745,138 | 5/1988 | Thanwalla | 522/120 |
| 4,882,376 | 11/1989 | Dusoleil | 524/166 |
| 4,957,955 | 9/1990 | Saur | 524/114 |

Primary Examiner—Carman J. Seccuro, Jr.
Attorney, Agent, or Firm—James Albert Drobile

[57] ABSTRACT

Free radical-curable compositions comprising a plastisol component and a copolymer containing free anhydride functionality and, optionally, other reactive diluents are provided. In particular, curable compositions employing a plastisol, preferably a polyvinyl chloride-containing plastisol, and a low molecular weight cross-linking copolymer component having free anhydride functionality and which is a partial esterification product of a terminally ethylenically unsaturated compound and a polymerizable maleic anhydride are provided. The compositions of the invention yield improved adhesives, sealants, coatings, and insulators for a wide variety of substrates and may be employed in a variety of coatings and castings. Processes for preparing cured plastisol compositions from the disclosed free radical-curable compositions are also provided.

58 Claims, No Drawings

PLASTISOL COMPOSITIONS

BACKGROUND OF THE INVENTION

1. Field of Invention

This invention relates to free radical-curable compositions comprising a plastisol component and a copolymer containing free anhydride functionality and, optionally, other reactive diluents. In particular, this invention relates to curable compositions employing a plastisol, preferably a polyvinyl chloride-("PVC-") containing plastisol, and a low molecular weight crosslinking copolymer component, which copolymer having free anhydride functionality and which is a partial esterification product of a terminally ethylenically unsaturated compound and a polymerizable maleic anhydride.

2. Statement of Related Art

It is generally understood in the art of making thermosetting plastics that plastisols are stable blends of a high molecular weight polymeric resin, typically polyvinyl chloride, in a nonvolatile, nonaqueous plasticizer. The polymeric resin forms the discontinuous phase of the plastisol dispersion or suspension, while the liquid plasticizer forms the continuous phase. Such liquid plasticizers are generally compatible with, but not solvents for, the polymeric resin. The presence of such plasticizers increases the workability and flexibility of the polymeric resin at normal room temperature storage and working temperatures, thereby maintaining the plastisol in a free-flowing state, though of variable viscosity. Plastisols are, therefore, generally considered to be stable dispersions of the two foregoing components, with or without additional volatile diluents and/or other additives. When present, volatile diluents are employed in minor amounts, typically to reduce the viscosity of the plastisol and generally in amounts less than about ten percent (10%) by weight. When volatile diluents are present, such polymeric resin dispersions are sometimes referred to as organosols. Also, when volatile solvents are utilized, they are normally evaporated prior to thermal fusion of the plastisol.

Once formed, a stable plastisol may be heated to form a thermoset polymer, which thermoset polymer may have a variety of physical properties; for example, the thermoset may be tacky, flexible or resilient. It will be appreciated by one skilled in the art that the physical properties of the thermoset product may be controlled through the selection of the resin and plasticizer employed to form the plastisol. Starting with the stable plastisol dispersion, the material may be thickened to a pre-gelled dispersion through the application of moderate heat. At the minimum fluxing temperature, which will vary with the resin and plasticizer that is chosen, the plastisol is converted into a gelled dispersion. Upon the application of additional heat and subsequent cooling, the plastisol forms a thermosetting polymer.

Thermosetting plastisol compositions for coating onto a compressible lamina are disclosed in U.S. Pat. No. 4,388,363 to Fountain. The disclosed plastisol compositions employ a polyvinyl chloride polymer, a polyacrylate (preferably a di- or triacrylate, the latter being a trimethylolpropane triacrylate) crosslinking monomer and a phenolic resin. The thermosetting plastisols of this patent preferably also contain a peroxide free radical initiator, and, optionally, may contain pigments, stabilizers and fillers. Dioctyl phthalate is the preferred plasticizer for the PVC resin.

U.S. Pat. No. 4,613,639 to Blum et al. discloses a process for manufacturing plastisols and organosols using synthetic resins other than polyvinyl chloride; for example, vinyl esters and (meth)acrylate copolymers and/or (meth)acrylate and acrylonitrile copolymers admixed with plasticizers and a protective colloid. Additional synthetic resins having acidic groups, preferably carboxyl groups, on the polymer molecule, include compounds made by the copolymerization of a synthetic resin with acidic monomers, such as olefinically-unsaturated mono- and dicarboxylic acids and the monoesters of the dicarboxylic acids with alcohols of 1 to 20 carbon atoms, including (meth)acrylic acid, maleic acid and half esters of maleic acid with alcohols of 1 to 20 carbon atoms. The acidic groups may optionally be introduced by chemical modification of the synthetic resin. Such modifications may be made to synthetic resins copolymerized with anhydride groups, such as maleic anhydride monomers, and the subsequent reaction of the anhydride groups with water or an alcohol.

U.S. Pat. No. 4,957,955 to Saur et al. describes plastisols manufactured from a dispersion in a suitable plasticizer of (meth)acrylonitrile and styrene or methylstyrene monomers and a carboxylic acid such as (meth)acrylic, itaconic, fumaric or maleic acid and, optionally, in substitution of the carboxylic acid or in addition thereto, an acrylic and/or methacrylic acid alkyl ester of a $C_2$ to $C_{12}$ alcohol, for example, butyl acrylate or 2-ethylhexyl acrylate.

U.S. Pat. No. 4,623,558 to Lin describes certain thermosetting plastisol dispersions comprising a poly(phenylene oxide) powder; a reactive plasticizer including, among other compounds, at least one liquid monomer, oligomer or prepolymer containing at least one ethylenically unsaturated group; and a thermal or photoinitiator, which plastisol dispersions after fluxing can form thermosets after the crosslinking reaction. The liquid monomers, oligomers, and prepolymers are disclosed as including acrylates and acrylate-terminated prepolymers.

U.S. Pat. No. 4,251,618 discloses photoactive, thermally coalescible resin plastisols comprising a polyvinyl chloride polymer having attached to the backbone photopolymerizable or photocrosslinkable groups, which polymer is dispersed in a liquid plasticizer medium also including a photoinitiator, which initiator is either a photoactive substituent present on the backbone of the polymer or a separate component of the plastisol dispersion. Disclosed polymeric compounds include vinyl chloride/acrylic acid and vinyl chloride/maleic anhydride copolymers modified to the half ester with hydroxy-containing cinnamates, benzophenones, and (meth)acrylates (for example, 2-hydroxyethyl(meth)acrylates).

SUMMARY OF THE INVENTION

An object of the present invention is to provide free radical curable modified plastisol compositions. The polymeric resin component of such modified plastisol compositions is crosslinked with a low molecular weight acrylate-terminated, free anhydride-containing crosslinking copolymer, which copolymer is an esterification product of a terminally ethylenically unsaturated compound and an anhydrous polymerizable anhydride in the presence of a free radical generating compound. The crosslinking copolymers of the present invention contain free anhydride functionality, as more fully set forth below. Such modified plastisol compositions are useful as improved adhesives, sealants, coatings, and insulators for a large variety of substrates, including glass; metals, including electrodeposited steel, galvanized steel, stainless steel, aluminum, iron, gold, silver, platinum, brass, copper, magnesium, tin, and lead/tin blends and primed and treated metallic surfaces; plastics; fabrics; paper; and may be employed in a variety of coatings and castings, and the like. The curable compositions of the invention may be applied by various conventional application means such as by spraying, rolling, dipping, etc.

Another object of the present invention is to provide thermally-curable plastisol compositions comprising: (1) a plastisol composition comprising a high molecular weight polymeric resin and a suitable plasticizer therefor, and, optionally containing pigments, stabilizers and fillers and the like; (2) a low-molecular weight partial ester of a free anhydride-containing copolymer, which copolymer is an esterification product of a terminally ethylenically unsaturated compound and an anhydrous polymerizable anhydride; (3) a free radical generating initiator; and, optionally (4), a liquid polyacrylate monomer as a reactive diluent, which thermally curable plastisol compositions yield thermally cured products having improved adhesive and physical properties, including improved tensile strength, elongation, modulus, cut resistance and oil resistance.

Yet another object of the present invention is to provide new and improved processes for the preparation of such plastisol compositions and cured products and articles manufactured therefrom.

It has been discovered that the foregoing objects are achieved in one aspect of the invention in which a free radical curable plastisol composition comprising a plastisol component, preferably a plastisol composition comprising a PVC resin or other suitable polymeric resin/plasticizer dispersion which forms a stable plastisol, and, optionally, containing blending and dispersion resins, fillers, stabilizers, pigments or other like constituents, is blended with a crosslinking copolymer component comprising a low molecular weight partial esterification product of a terminally ethylenically unsaturated compound and a polymerizable maleic anhydride having free anhydride functionality, as hereinafter described. The plastisol component and copolymer component blend is then preferably supplemented with a free radical-generating compound, preferably an organic peroxide and, optionally, may also contain other polyfunctional acrylate monomers, whereupon by application of heat followed by cooling the composition yields a thermosetting plastisol.

In another aspect of the invention a PVC plastisol composition may be blended with a copolymer component having free anhydride functionality, comprising a low molecular weight partial esterification product of a terminally ethylenically unsaturated compound and a polymerizable maleic anhydride, as hereinafter described, which crosslinking copolymer is dispersed in a suitable liquid polyacrylate monomer, and which composition contains a suitable free radical-generating compound. Upon the application of heat the modified plastisol composition yields a thermosetting plastisol.

Accordingly, the present invention broadly pertains to free radical-curable, modified plastisol compositions, cured modified plastisol compositions produced by, and the process of curing a blend comprising:

(a) about 90% to about 50% (preferably about 95% to about 75%) by weight, based on the total weight of the free radical-curable, modified plastisol composition, of a plastisol composition derived from a homopolymer or copolymer of vinyl chloride monomers and a suitable plasticizer therefor;

(b) a crosslinking-effective amount, broadly about 1% to about 50%, and preferably about 1% to about 10% by weight, based on the total weight of said free radical-curable, modified plastisol composition, of a partial ester of a free anhydride-containing, terminally ethylenically unsaturated copolymer, corresponding to the structural formula:

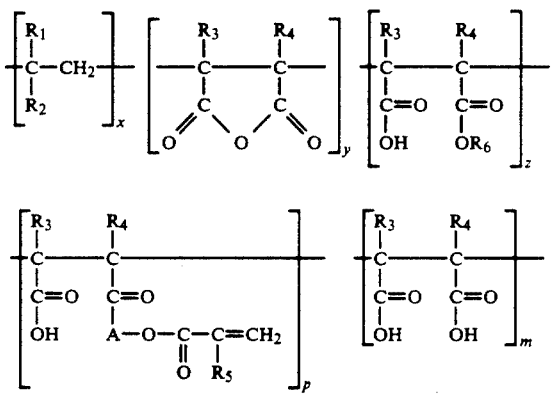

wherein: $R_1$ and $R_2$ may be the same or different and each may independently be selected from a member of the group consisting of hydrogen, alkyl containing from 1 to 20 carbon atoms, aryl containing from 6 to 10 carbon atoms, alkaryl containing from 7 to 14 carbon atoms, cycloalkyl containing from 4 to 12 carbon atoms, and a halogen radical (for example, chlorine, fluorine or bromine) (and wherein $R_1$ and $R_2$ preferably may be the same or different and each may be selected from a member of the group consisting of hydrogen, phenyl, benzyl, or cycloalkyl of 4 to 6 carbon atoms, and most preferably where $R_1$ is hydrogen and $R_2$ is phenyl); $R_3$, $R_4$ and $R_5$ each may be the same or different and each independently may be selected from a member of the group consisting of hydrogen, and an alkyl radical containing from 1 to 5 carbon atoms (and wherein $R_3$, $R_4$ and $R_5$ preferably may be the same or different and each may be selected from a member of the group consisting of hydrogen and methyl and most preferably where $R_3$, $R_4$ are each hydrogen and $R_5$ is methyl); the radical $R_6$ is a member selected from the group consisting of an alkyl, arylalkyl, alkyl-substituted arylalkyl and oxyalkylated derivatives of each of such radicals containing from 2 to 4 carbon atoms in each oxyalkylene group, which group may be of 1 to 20 repeating units (and wherein $R_6$ preferably is an alkyl radical containing from 1 to 6 carbon atoms and most preferably where $R_6$ is not present); the radical A is a linear or branched divalent alkylene of from 1 to 20 carbon atoms, or an oxyalkylated derivative thereof containing from 2 to 4 carbon atoms in each oxyalkylene group, which group may be of 1 to 20 repeating units (and wherein A preferably is an alkylene hydrocarbon chain containing from 2 to 4 carbon atoms and most preferably 2 carbon atoms), and subscripts x, y, z, m and p are each whole numbers such that the sum of x, y, z, m and p may range from 3 to about 20, with x, p and y each being equal to or greater than 1, and m and z may each be zero (and wherein preferably x ranges from about 8 to about 12, y ranges from about 0 to about 4, z is 0, p ranges from about 6 to about 12, and m is 0), said partial ester being characterized as exhibiting a number average molecular weight of between about 1,000 and 20,000 (preferably about 2,000 to about 4,000), an acid number of at least about 40 (preferably between about 100 and about 300), and an acrylate equivalent per gram value of at least about 0.1 (preferably between about 1 and about 2);

(c) a cure-effective amount, broadly about 0.01% to about 10% and preferably about 0.1% to about 1% by weight, based on the total weight of said free-radical curable modified plastisol composition, of a free radical generating compound, preferably an organic peroxide, and most preferably a perbenzoate compound; and (d) optionally, a liquid poly(meth)acrylate monomer in an amount sufficient to disperse said crosslinking copolymer therein, broadly about 1% to about 10% by weight, based on the total weight of said free radical curable modified plastisol composition.

DESCRIPTION OF THE PREFERRED EMBODIMENTS

Plastisols

The novel free radical curable compositions of the present invention employ a blend of a plastisol component and a crosslinking copolymeric component, as more fully set forth below. The plastisol dispersions are formed in the conventional manner and the process of manufacturing such plastisol dispersions does not form part of the present invention. Plastisols may generally be prepared in accordance with standard procedures known in the art including such procedures as are described in H.A. Sarvetnick, "Plastisols and Organosols", Van Nostrand Reinhold Company, New York 1972, which is incorporated herein by reference. Generally, such synthetic polymeric resins are prepared using monomers selected to yield synthetic resins producing acceptable plastisols upon the addition of a suitable plasticizer. As heretofore stated, a "suitable plasticizer" shall mean a nonaqueous, nonvolatile liquid dispersing medium that is compatible with, but not a solvent for the particular polymeric resin, which plasticizer is chosen to form the continuous phase of the plastisol dispersion. Further, such suitable plasticizers increase the workability and flexibility of the polymeric resin at normal storage and working temperatures, thereby maintaining the plastisol in a free flowing state, though of variable viscosity, and upon the application of heat and subsequent cooling such plasticizers yield a thermoset resin article.

Conventional representative plastisols that may be potentially usable in the present invention preferably include polyvinyl chloride plastisols formed from homopolymers or copolymers of polyvinyl chloride dispersed in a suitable plasticizer. Polyvinyl chloride copolymers could include, for example, copolymers of vinyl chloride with maleic anhydride, vinyl alcohol, vinyl acetate or (meth)acrylic acids, as described in U.S. Pat. No. 4,251,618 to McCartin, or copolymers of vinyl chloride monomers with copolymerizable comonomers such as acrylic esters derived from saturated $C_2$ to $C_{10}$ aliphatic alcohols, as described in U.S. Pat. No. 4,882,376 to Dusoleil et al., which references are incorporated herein by reference. Additional plastisols potentially usable in the present invention also may include the polyvinyl chloride-containing plastisols as, for example, those described in U.S. Pat. No. 4,388,363 to Fountain and the copolymer resins containing (meth)acrylate compounds of vinyl ester as described in U.S. Pat. No. 4,613,639 to Blum et al, which references are also incorporated herein by reference. Preferred plastisol compositions contain a major amount of vinyl chloride monomeric units forming the resin. The manner in which vinyl chloride polymers are formed is not critical to the practice of the present invention. A representative and fairly typical formulation of a PVC containing plastisol composition would employ 100 parts of PVC resin, dispersion grade, and about 60 parts of dioctyl phthlate.

While not forming part of the present invention, plasticizers that are useful in the preparation of plastisols include any compound that is of low volatility and which produce dispersions of the polymeric resin particles in the plasticizer and which upon the application of moderate heat, permeate the polymeric resin particles to cause adherence of such particles. Upon the application of additional heat, such plasticizers dissolve the resin causing fusion of the plasticizer and resin to yield a thermoset article. Typical plasticizers include normal and branched chain alcoholic esters and glycol esters of various mono-, di- and tribasic acids, for example, esters of phthalic, adipic, sebacic, azelaic, citric, trimellitic (and anhydride) and phosphoric acids; chlorohydrocarbons; esters of long chain alcohols; liquid polyesters; and epoxidized natural oils, such as linseed and soya oils. Representative phthalate plasticizers include: di-2-ethylhexyl (dioctyl) phthalate, diisoctyl phthalate, diisonyl phthalate, diisodecyl phthalate, n-$C_6$–$C_8$–$C_{10}$ phthalates, n-octyl-n-decyl phthalate, ditridecyl phthalate, butylbenzyl phthalate, dihexyl phthalate, butyl ocytyl phthalate, dicapryl phthalate, and di-2-ethylhexyl isophthalate. Additional plasticizers include: di-2-ethylhexyl adipate, diisonyladipate, n-octyl-n-decyl adipate, diisodecyl adipate, di-2-ethylhexyl azelate, tri-2-ethylhexyl trimellitate, triisonyl trimellitate, n-octyl-n-decyl trimellitate, tricresyl phosphate, cresyl diphenyl phosphate, 2-ethylhexyl diphenyl phosphate, decyl diphenyl phosphate, and polyester plasticizers. Ideally the plasticizer exhibits good aging stability and crosslinkability upon curing. Plasticizers are typically employed in plastisol compositions within very broad ranges. Generally, the amount of polymer solids incorporated into the liquid plasticizer dispersing medium, taking into consideration characteristics such as coatability, wetting, ease of stirring, and the like, will be in the range of 5% to 95% by weight of the plastisol component of the present invention or in other words in an amount ranging from about 5 to about 2,000 parts of plasticizer per 100 parts per weight of polymeric resin.

CROSSLINKING COPOLYMERS

The crosslinking copolymer component of the present invention comprises a novel copolymer which is a partial ester of a hydroxyalkyl acrylyl compound, or an admixture of such acrylyl compound and an aliphatic or an aralkyl monohydric alcohol, and a low molecular weight free-anhydride-containing copolymer of a terminally ethylenically unsaturated compound and a polymerizable maleic anhydride. The foregoing compounds are described in detail in U.S. Pat. Nos. 4,722,947 and 4,745,138 to Thanawalla et al., which are incorporated herein by reference. Such crosslinking copolymers may be manufactured in accordance with the teachings of the foregoing patents by processes described therein, including radiation curing. The manufacture of such crosslinking copolymers does not form part of the present invention.

The radiation curable partial ester copolymer free anhydride-containing compositions of the invention, in general, corresponds to the formula:

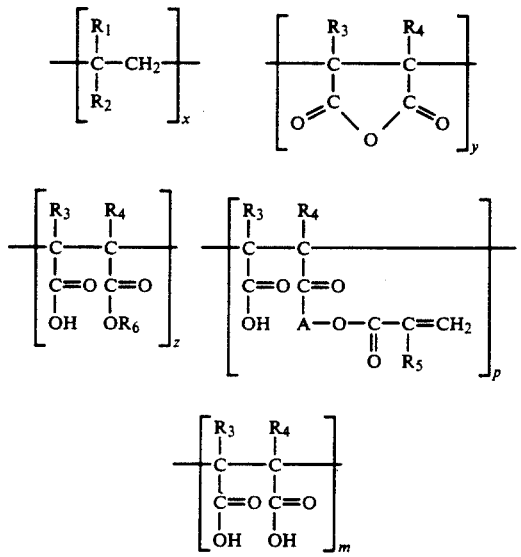

With regard to the foregoing structural formula, $R_1$ and $R_2$ may be the same or different and each may be independently selected from the group consisting of hydrogen, alkyl containing from 1 to 20 carbon atoms, aryl containing from 6 to 10 carbon atoms, alkaryl containing from 7 to 14 carbon atoms, cycloalkyl containing from 4 to 12 carbon atoms (preferably 4 to 6 carbon atoms), and halogen such as chlorine, fluorine or bromine. In preferred embodiments of the invention, $R_1$ and $R_2$ may be the same or different and each independently may be hydrogen, methyl, phenyl, benzyl, or cycloalkyl of 4 to 6 carbon atoms, and most preferably $R_1$ may be hydrogen and $R_2$ may be phenyl.

The radicals $R_3$, $R_4$ and $R_5$ may be the same or different and each may be independently selected from the group consisting of hydrogen, and an alkyl radical containing from 1 to 5 carbon atoms. In preferred embodiments of the invention, the radicals $R_3$, $R_4$ and $R_5$ are each independently hydrogen and/or methyl and most preferably $R_3$, $R_4$ may each be hydrogen and $R_5$ methyl.

The radical $R_6$ is a member selected from the group consisting of an alkyl, aralkyl, alkyl-substituted aralkyl radicals containing from 1 to 20 carbon atoms, and oxyalkylated derivatives of each of such radicals containing from 2 to 4 carbon atoms in each oxyalkylene group, which group may be of 1 to 20 (preferably 1 to 6) repeating units. In preferred embodiments of the invention, $R_6$ is an alkyl radical containing from 1 to 6 carbon atoms and most preferably is not present.

The radical A is a linear or branched divalent alkylene of 1 to 20 carbon atoms, or an oxyalkylated derivative thereof containing from 2 to 4 carbon atoms in each oxyalkylene group, which group may be of 1 to 20 (preferably 1 to 6) repeating units. In preferred embodiments, A is an alkylene chain containing from 2 to 4 carbon atoms and most preferably 2 carbon atoms.

In the foregoing structural formula, subscripts x, y, z, m and p are each whole numbers, such that the sum of x, y, z, m and p may range from 3 to about 20, with x, p and y each being equal to or greater than 1, and m and z may each be zero (preferably x ranges from about 8 to about 12, y ranges from about 0 to about 4, z is 0, p ranges from about 6 to about 12, and m is 0). In preferred embodiments of the invention x is preferably equal to 3 to 20, as well as to the sum of y, z, m and p.

In general, the free anhydride-containing, partial ester crosslinking copolymers usable in the invention may be liquids or free flowing solids, depending upon their molecular weight. Such copolymers are further characterized by having a number average molecular weight of between about 1,000 and 20,000 and preferably between about 2,000 and 4,000. The copolymers are additionally characterized as having an acid number of at least 40, preferably between 100 and 300, an acrylate equivalent per gram value of at least 0.1, preferably of between about 1 and about 2, and a glass transition temperature of at least 40° C. (104° F.) and preferably between about 50° C. (122° F.) and 100° C. (212° F.).

U.S. Pat. Nos. 4,722,947 and 4,745,138 set out the procedure for making crosslinking copolymers usable in the present invention. Briefly, about 0.1 to 49.9%, preferably about 30 to 45%, of the number of potential carboxyl groups present as acid anhydride groups in the anhydride-containing copolymer reactant are reacted with the hydroxyalkyl acrylyl compound, or an admixture thereof with an aliphatic or an aralkyl alcohol, to yield the crosslinking copolymer.

In accordance with the teachings of U.S. Pat. No. 4,745,138, and to yield crosslinking copolymers wherein the maleic acid moiety "m" set forth above is a positive whole integer, the esterification reaction may be effected in the absence of any solvent for the reactants, but is generally carried out in the presence of a solvent capable of dissolving the reactants, at least at their boiling point. Solvents meeting such attributes are well known in the art. Illustrative examples include cyclic or acyclic dialkyl or aralkyl ethers, such as tetrahydrofuran 1,4-dioxane, 2-chlorethyl vinyl ether, and the like, aromatic hydrocarbons such as toluene, xylene, and cumene, and halogenated alkanes and aromatics such as 1,1,2-trichloroethane, chlorobenzene, perchloroethylene, chlorobenzene and the like.

Alternatively, U.S. Pat. No. 4,722,947 teaches the procedures for the manufacture of crosslinking copolymers wherein the copolymer contains no unreacted maleic acid "m" moieties and thus subscript "m" is equal to 0. To produce such crosslinking copolymers, it is critical that the anhydride containing copolymer reactant utilized in the foregoing esterification reaction be anhydrous in nature and that anhydrous conditions be maintained throughout the esterification reaction. Thus if solvents are employed, such solvents should be capable of forming an azeotrope with water, while being substantially immiscible with water. Such solvents generally have a boiling point range of about 100° C. (212° F.) and 150° C. (302° F.), preferably between about 100° C. (212° F.) and 120° C. (248° F.) at ambient pressure and should readily dissolve the copolymer at least at the boiling point of the solvent. Further, the solvents should be inert and therefore preclude hydrolysis of the anhydride and be inert to mild base, if employed, as catalyst.

Solvents meeting such attributes are well known in the art. Illustrative examples include cyclic or acyclic dialkyl or arylalkyl ketones such as cyclopentanone, 3-pentene-2-one, 2-pentanone, 3-pentanone, methyl isobutyl ketone and the like; cyclic or acyclic dialkyl or aralkyl ethers, such as 1,4-dioxane, 2-chlorethyl vinyl ether, and the like; halogenated alkanes, such as 1,1,2-trichloroethane, chlorobenzene, perchloroethylene, and the like; nitroalkanes such as nitroethane, nitropropane, and the like; and organic esters, such as propyl acetate, ethyl carbonate, and the like.

In the manufacture of the crosslinking copolymer of the present invention, the anhydride-containing copolymer reactant employed in preparing the partial ester crosslinking copolymer may be obtained by any conventional polymerization technique, such as bulk, emulsion, suspension, or solution polymerization. From about 0.5 to about 50 mole %, preferably about 2 to 20 mole %, of an anhydride monomer such as maleic anhydride, or lower alkyl substituted derivatives thereof, containing from 1 to 5 carbon atoms and mixtures thereof, may be reacted with from about 50 to 99.5 mole %, preferably from about 70 to about 98 mole %, of at least one ethylenically unsaturated monomer having the formula $CH_2=C(R_1)(R_2)$, wherein $R_1$ and $R_2$ are as above indicated. Illustrative ethylenically unsaturated monomer suitable for reaction with the anhydride monomer include ethylene, propylene, 1-octene, styrene, alpha-methylstyrene, p-tertiary-butylstyrene, vinylcyclohexane, and vinyl chloride.

Especially preferred reactants for preparation of the aforementioned free-anhydride containing copolymers used in the invention are styrene/maleic anhydride copolymers having a mole ratio of styrene to maleic anhydride of about 1:1 to 4:1, preferably 1:1 to 2:1. Such copolymers have a number average molecular weight of between about 500 to 4,000 and preferably from about 1,000 to 3,000, the most preferred range being between about 1,500 and 2,500. These copolymers are commercially available under the trade name SMA resins from Atochem North America, King of Prussia, Pa.

To produce the crosslinking copolymers disclosed in U.S. Pat. No. 4,722,947, it is important to utilize anhydrous anhydride-containing copolymer reactants. Alternatively, anhydride-containing copolymer reactants in which the original anhydride groups have undergone hydrolysis may be reconstituted to the anhydride state by employing conventional procedures wherein water is removed from the copolymer reactant by azeotroping the copolymer reactant with any convenient solvent that readily dissolves the resin. Other alternative procedures for producing the crosslinking copolymer involve the use of organic solvents which are immiscible with water, such as ketones, including methyl isobutyl ketone, as indicated above.

As the hydroxyalkyl acrylyl compound employed for esterification of the free-anhydride containing copolymer reactant, there may be employed a hydroxyalkyl acrylate or a hydroxyalkyl methacrylate, as well as oxyalkylene derivatives thereof containing from 2 to 4 carbon atoms in each alkylene oxide unit (which may be of 1 to 20 repeating units). The foregoing compounds correspond to the following structural formula:

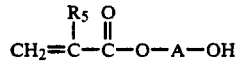

wherein the radicals $R_5$ and A are as indicated hereinabove. The hydroxyalkyl acrylyl compounds are well known in the art and may be illustrated by hydroxyethyl acrylate, hydroxyethyl methacrylate, tripropylene glycol monoacrylate, tetrapropylene glycol monomethacrylate, tetrapropylene glycol monoacrylate, and the like.

Alternatively, an admixture of the aforedescribed acrylyl compound and an aliphatic or an arylalkyl monohydric alcohol, or oxyalkylated derivative of such aliphatic or arylalkyl monohydric alcohol containing from 2 to 4 carbon atoms in each oxyalkylene group, which groups may be of 1 to 20 repeating units, preferably 1 to 6 repeating units, may be employed in the esterification of the copolymer. Typical illustrative monohydric alcohols employable for such purpose include alkanols such as methanol, ethanol, propanol, cyclohexyl alcohol, benzyl alcohol, alpha-phenethyl alcohol, beta-phenethyl alcohol nonylbenzyl alcohol, as well as oxyalkylene derivatives of such alcohols wherein at least one, 1,2-alkylene oxide, such as ethylene oxide, 1,2-propylene oxide, or 1,2-butylene oxide has been condensed therewith.

Although the anhydride-containing copolymer may be first reacted with the hydroxyalkyl acrylate and subsequently with the monohydric alcohol, or alternatively, first reacted with the monohydric alcohol and subsequently reacted with the hydroxyalkyl acrylate, preferred practice of the invention resides in the simultaneous reaction of admixture of the hydroxyalkyl acrylate and monohydric alcohol, thereby forming the desired partial ester of the anhydride-containing copolymer of the invention. When an admixture of the hydroxyalkyl acrylyl compound and monohydric alcohol is employed to esterify the free anhydride-containing polymer, the molar ratio of monohydric alcohol to hydroxyalkyl acrylyl compound will generally range from between about 1:10 to 10:1, and preferably from between about 1:1 and 1:5.

The esterification reaction is carried out at the reflux temperatures of the reaction admixture, generally at temperatures from about 50° C. (122° F.) to 150° C. (302° F.) and preferably from about 95° C. (203° F.) to about 120° C. (248° F.). Although a catalyst need not be employed, the esterification reaction is normally effected in the presence of suitable catalyst, such as an alkali metal alkanoate, illustratively, sodium acetate, potassium propionate, or lithium acetate.

To prevent radical polymerization of the resultant partial ester, there may also be included in the esterification reaction a radical-polymerization inhibitor present in amount of about 0.001 to 2 wt %, based on the weight of the partial ester. Illustrative inhibitors employable for such purpose include phenols exhibiting steric hindrance such as hydroquinone, hydroquinone monomethyl ether, 2,6-ditertiary butyl p-cresol, and the like.

The radiation-hardenable compositions described in U.S. Pat. Nos. 4,722,947 and 4,745,138 may be cured by means of high-energy radiation, such as electron beam, UV light, gamma rays, etc., but preferably by electron beam radiation.

In the formulation of the free radical-curable modified plastisol compositions of the present invention, the amount of crosslinking copolymer utilizable in the present invention may be varied over a broad range of about 1% to about 50% by weight of the total free radical-curable modified plastisol composition. Advantageously, amounts of crosslinking copolymer ranging from about 1% to 10% by weight of the total composition may be employed.

REACTIVE DILUENTS

The modified free-radical curable plastisol compositions of the present invention in one aspect may optionally contain reactive diluents. Such reactive diluents serve as diluents for the crosslinking copolymers described in detail above. Suitable reactive diluents comprise one or more free radical polymerizable, substantially nonvolatile, liquid monomers or oligomers of up to about 2,000 molecular weight, selected from monoethylenically unsaturated and polyethylenically unsaturated materials and mixtures thereof.

Suitable monoethylenically unsaturated materials include vinyl monomers such as the lower alkyl esters of acrylic or methacrylic acid including methyl methacrylate, ethyl acrylate, 2-ethylhexyl acrylate, butyl acrylate, and isobutyl methacrylate; vinyl esters such as vinyl acetate and vinyl propionate; vinyl halides such as vinyl chloride and vinylidene chloride; and particularly high solvency monomers such as 2,2-ethoxyethoxyethyl acrylate, tetrahydrofurfuryl acrylate, n-laurylacrylate, 2-phenoxyethylacrylate, glycidyl acrylate, glycidyl methacrylate, isodecyl acrylate, isoctyl acrylate, and the like. Other monosethylenically unsaturated reactive diluents include vinyl aromatics such as styrene; alphamethylstyrene, vinyl toluene, indene and p-tert butyl styrene; ethylenically unsaturated acids such as fumaric acid, maleic anhydride and the esters thereof; and nitrogen containing monomers such as acrylonitrile, methacrylonitrile, acrylamide, methacrylamide, N,N-dimethacrylamide, N-vinyl-pyrrolidine, N-vinylcaprolactam, and the like.

The polyethylenically unsaturated reactive diluents include polyol polyacrylates and multi-functional methacrylates, such as alkane ($C_2$–$C_{16}$) diol diacrylates, aliphatic ($C_2$–$C_{16}$) polyacrylates, alkoxylated aliphatic polyacrylates such as described in U.S. Pat. No. 4,382,135, which is incorporated herein by reference, polyether glycol diacrylates and the like. Typical of the foregoing are a variety of diacrylates including: ethylene glycol dimethacrylate, diethyleneglycol di(meth)acrylate, triethylene glycol di(meth)acrylate, tetramethylene glycol di(meth)acrylate, neopentyl glycol di(meth)acrylate, 1,6-hexanediol di(meth)acrylate, 1,3-butylene glycol di(meth)acrylate, 1,4-butanediol di(meth)acrylate, polyethylene glycol di(meth)acrylate, tripropylene glycol diacrylate and ethoxylated bisphenol A di(meth)acrylate. Other multifunctional reactive diluents would include trimethylol propane based polyacrylates such as trimethylolpropane triacrylate and trimethylolpropane trimethacrylate; and the pentaerythritol-based polyacrylates or polymethacrylates described in U.S. Pat. No. 4,399,192, which is incorporated herein by reference. Especially preferred polyethylenically unsaturated reactive diluents include ethylene glycol dimethacrylate, trimethylolpropane trimethacrylate, 1,3-butylene glycol dimethacrylate, and mixtures thereof.

The reactive diluents are conventionally sold with a free radical polymerization inhibitor content ranging from about 25 to 2,000 ppm. Illustrative free radical polymerization inhibitors have been described above. Of course, if the reactive diluents are produced at the site of radiation curing, little or no inhibitor need by present in the diluents.

In addition to reactivity and the desired degree of crosslinkability, the reactive diluents will be selected on the basis of their solvency for the free-anhydride containing crosslinking copolymer component and their contribution to the viscosity of the resulting solutions. Generally, the less polar the reactive diluent the greater the solvency for said crosslinking copolymer. Solvency and viscosity can be determined conveniently by preparing mixtures over a range of concentrations, noting the clarity and compatibilities, and measuring the viscosities. In those cases where solvency in a single diluent is insufficient, one or more other diluents may be added to optimize compatibility. The higher the molecular weight of the copolymer, the less soluble the copolymer will be in some of the reactive diluents. Accordingly, the molecular weight of copolymer must be balanced with the ease with which solutions can be formed and the acceptability of the resulting viscosities and properties relative to the end uses with the plastisol component. The formulator of radiation curable compositions is well aware of all of the foregoing and other considerations and can make appropriate selections of components of the compositions and proportions by routine experimentation and judgment in order to obtain a desired balance of properties.

An inert solvent may also be added to the curable compositions to provide better flow or wetting and extremely thin films, e.g., less than 0.2 mils. The solvents may be flashed off before irradiation or left in the composition during the cure. Representative inert solvents are ketones such as methylethyl ketone, haloalkanes such as dichloromethane and crosslinking copolymer component and their contribution to the viscosity of the resulting solutions. Generally, the less polar the reactive diluent the greater the solvency for said crosslinking copolymer. Solvency and viscosity can be determined conveniently by preparing mixtures over a range of concentrations, noting the clarity and compatibilities, and measuring the viscosities. In those cases where solvency in a single diluent is insufficient, one or more other diluents may be added to optimize compatibility. The higher the molecular weight of the copolymer, the less soluble the copolymer will be in some of the reactive diluents. Accordingly, the molecular weight of copolymer must be balanced with the ease with which solutions can be formed and the acceptability of the resulting viscosities and properties relative to the end uses with the plastisol component. The formulator of radiation curable compositions is well aware of all of the foregoing and other considerations and can make appropriate selections of components of the compositions and proportions by routine experimentation and judgment in order to obtain a desired balance of properties.

An inert solvent may also be added to the curable compositions to provide better flow or wetting and extremely thin films, e.g., less than 0.2 mils. The solvents may be flashed off before irradiation or left in the composition during the cure. Representative inert solvents are ketones such as methylethyl ketone, haloalkanes such as dichloromethane and other industrial solvents.

FREE RADICAL CURING AGENTS

Vulcanizing agents which decompose to produce free radicals during the curing cycle may be advantageously employed as curing agents in the present invention. Examples of the free-radical generating compounds of the present invention include: peroxides, such as hydrogen peroxide; percarbonates; persulfates, such as ammonium persulfate and potassium persulfate; perbenzoates, such as t-butyl perbenzoate and t-amyl perbenzoate; azo compounds, such as 2,2'-azobisisobutyronitrile, 2,2'-azobis-2-methylvaleronitrile, 1,1'-azobis-1-cyclohexane dinitrile, and the like; and a variety of organic peroxides. Tertiary perbenzoates, such as t-butyl perbenzoate and t-amyl perbenzoate, during compounds are generally preferred.

Other di-tertiary peroxide agents and their homologs and analogs which could be utilized in the present invention correspond essentially to the following structural formula:

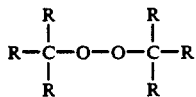

These ditertiary peroxide agents contain at least one peroxy group disposed between tertiary carbon atoms, which tertiary carbon atoms are linked to carbon atoms constituting portions of each of the R groups, which R groups may be alkyl (including straight, branched or cyclic) alkenyl or aryl groups, or mixtures of such groups, and which R groups may be further substituted by non-hydrocarbon groups, for example, ethers, additional peroxy groups, or halogen, such as chlorine, and which organic peroxides do not interfere with either the curing process or the cured plastisol product.

Illustrative organic peroxides include diacetyl peroxide, dibenzoyl peroxide, dicapryl peroxide, di-(p-chlorobenzoyl) peroxide, didecanoyl peroxide, di-(2,4-dichlorobenzoyl) peroxide, diisobutyl peroxide, diisononanoyl peroxide, dilauroyl peroxide, dipelargonyl peroxide, dipropynyl peroxide, di(betacarboxypropinoyl) peroxide, methyl ethyl ketone peroxide, cyclohexanone peroxide, dihydroxy-dimethyl-dioxacyclopentane, t-butyl peroxide, t-butyl peroxy(2-ethylhexanoate), t-butylperoxyisobutylate, O,O-t-butyl-O-isopropylmonoperoxycarbonate, t-butylperoxypivalate, dimethyl-di(benzoylperoxy)hexane, t-butyl-peroxy(2-ethylbutylate), di-t-butyl peroxide, dicumyl peroxide, 2,5-bis(t-butylperoxy)-2, 5-dimethylhexane, t-butyl hydroperoxide, cumyl hydroperoxide, a,a'-bis-(t-butylperoxy)diisopropyl benzene, 1,1-di-t-butylperoxy-3, 3,5-trimethylcyclohexane and n-butyl-bis(t-butylperoxy)-valerate and the like. Among the foregoing free radical-generating compounds mentioned above, dicumyl peroxide, (DICUP TM), 1,1-di-t-butylperoxy-3, 3,5-trimethylcyclohexane, di-t-butyl peroxide (both available from AKZO Chemicals, Inc. of Chicago, Ill.), 2,5-dimethyl-2, 5-di[t-butylperoxy]-2 hexane (VAROX DBPH 50) 2,5-dimethyl-2, 5-di-t-butylperoxy-3-hexyne (LUPERSOL 130 TM), and a,a'-bis-(t-butylperoxy)-diisopropyl benzene (VULCUP R TM) are commercially available and conveniently used. The foregoing organic peroxides may be used alone or in combinations.

The amount of the free radical-generating compound used in the curable plastisol compositions of the present invention may be varied depending on the crosslinking copolymer that is selected and the intended end use of the composition. The required amount of free radical-generating compound required to practice the present invention is therefore a cure effective amount readily ascertainable by one of ordinary skill in the art, although it is generally to be employed in an amount of about 1 part per about 100 parts of crosslinking copolymer or about 0.01% to 10% by weight of the total formulation. The optimum content of the free radical generating compound is between about 0.01% and 1.0% by weight of the total formulation.

Without departing from the scope of the present invention, and as appreciated by those skilled in the art, inert fillers, organic and inorganic pigments, soluble dyes, viscosity regulators, sedimentation inhibitors, oxidation inhibitors, flow improvers, extenders and other adjuvants used in plastisol and organosol technology may optionally be included in the curable plastisol compositions of the invention. If such adjuvants are desired, adjuvants which do not interfere with the free radical curing process described herein may be used.

The crosslinking copolymers, in conjunction with the plastisol formulations described in detail above, improve the adhesion and physical properties of the plastisol compositions. Thus, the compositions of the invention provide thermally curable plastisol formulations for use in paintable automobile primers, automobile anticorrosion sealants, and the like. Such formulations afford an automobile protection from foreign objects such as rocks, salt, chemicals, and other sharp objects. Additional intended applications include use in adhesives, sealants, coatings, molded components, wire and cable coatings, and insulation materials, in which the plastisol composition may be blended with other ingredients to make a suitable coating, adhesive, sealant, molding compound or wire and cable insulation. When used in such applications, the modified plastisol compositions of the present invention improve the adhesion qualities of the coating, adhesive, sealant, molding compound or wire and cable insulation. Physical properties may also be improved such as tensile, elongation, modulus, cut resistance, oil resistance, etc.

The modified plastisol compositions of the present invention may be applied to typical plastisol substrates using typical application methods such as spray, roll, bar, curtain, dip coating, etc. Typical substrates are aluminum, steel, electro-deposited steel, galvanized steel, stainless steel, glass, etc. The coating is applied at thicknesses ranting from 0.2 mils to 1 inch thick, with typical thicknesses of 0.5-250 mils.

Following application of the plastisol compositions of the present invention, such applied compositions can then be cured by typical plastisol baking conditions, usually 250°-375° F. (121°-190° C.), and possible at 150°-450° F. (65°-232° C.) and 80°-600° F. (26°-315° C.) as well, for periods of 10 minutes to as long as three hours. Baking can take place in air, under vacuum, or in an inert atmosphere, for example, under a nitrogen blanket.

As a result of the crosslinking copolymer component of the present invention, the plastisol compositions have been modified to provide hydroxyl, carboxylic acids and ethylenic unsaturation reactive sites. The foregoing reactive sites facilitate reactions with epoxies (oxiranes), amines, amides, isocyanates, bases, salts, other ethylencially unsaturated molecules, and thiols.

The invention will be further clarified by a consideration of the following examples, which are intended to be purely exemplary of the use of the invention.

EXAMPLES

The free radical curable modified plastisol compositions of the invention are generally prepared by blending the plastisol component, comprising a vinyl chloride homopolymer or copolymer dispersed in a plasticizer, and, optionally, containing other inert ingredients such as fillers, pigments and stabilizers, with the free anhydride-containing crosslinking copolymer disclosed herein, in a suitable blender. To this blend, is added the free radical generating compound. The compositions are then thoroughly blended. The order of addition of ingredients is not particularly critical. For instance, it is permissible to add the free radical generating compound to an admixture of multi-functional methacrylate diluents, as hereinafter described, whereupon the free radical generating compound and reactive diluents are thoroughly blended. Such an admixture may be then blended with the selected plastisol components and crosslinking copolymer.

In the following Tables, all of the ingredients are expressed in parts by weight, unless otherwise noted.

EXAMPLES 1-3

In accordance with the general procedures outlined above, Examples 1-3 correspond to three modified plastisol formulations of the present invention, wherein the levels of the crosslinking copolymer and a reactive diluent therefore were varied. Table 1 below sets forth the relative amounts of the crosslinking copolymer and the reactive diluent, which for the purposes of Examples 1-3 corresponded to trimethylolpropane trimethacrylate.

TABLE 1

| Component | Parts by Weight | | |
|---|---|---|---|
| | Example 1 | Example 2 | Example 3 |
| PVC plastisol base compound (1) | 90 | 90 | 90 |
| crosslinking copolymer (2) | 3.5 | 4.2 | 5.1 |
| TMPTMA | 6.5 | 5.8 | 4.9 |
| t-butyl perbenzoate | 0.5 | 0.5 | 0.5 |

(1) A suitable exemplary plastisol composition:

| | Parts by Weight |
|---|---|
| Dioctyl phthalate | 60 |
| Polyvinyl chloride resin dispersion grade (e.g. B. F. Goodrich, Geon 121) | 100 |

(2) The crosslinking copolymer utilized in the Examples 1 to 3 corresponds to the following structural formula:

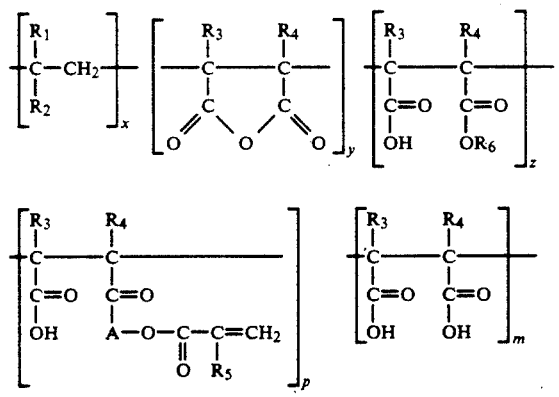

To prepare the foregoing modified plastisol compositions of Examples 1-3, 0.5 grams of t-butyl perbenzoate was added to 10 grams of an admixture of the crosslinking copolymer identified above and trimethylolpropane trimethacrylate (TMPTMA), according to the proportions identified in Table 1. The crosslinking copolymer and the TMPTMA were blended in a suitable container by hand until they were mixed thoroughly and dispersed. The admixture of the free radical generating compound, crosslinking copolymer and reactive diluent, as aforesaid, was then blended with 90 grams of PVC plastisol base compound in a separate plastic beaker and mixed thoroughly with a wooden spatula.

The modified plastisol formulations of Examples 1 to 3 were separately applied to ED-11 electrocoated steel substrate using the drawdown method with a step gap applicator ranging from 4-20 mils. The coated substrates were then placed in a vented forced air drying oven at 325° F. for 22 minutes.

Plastisol coating adhesion was tested by placing a hard object at a 45° angle against the substrate and moving the hard object across the coated substrate. The hard object peeled, or lifted, the plastisol which had no adhesion. When the adhesion passed, the hard object could not remove plastisol from the top layer of the substrate. Subsequently, the plastisol coating thickness was measured to the nearest 0.0001 inch.

The cured, coated substrates exhibited a coating to metal bond superior to that typically observed for formulations containing just TMPTMA monomer alone and in the case of Examples 2 and 3, better results were obtained. Good adhesion (cohesive failure) was obtained at less than 10 mil coating thickness to ED-11 electrocoated steel for Example 3.

EXAMPLE 4

A modified plastisol composition the same as Example 1 was prepared, except 5% by weight of the total formulation of the crosslinking copolymer/reactive diluent blend was used, as set forth in Table 2 below:

TABLE 2

| Component | Parts by Weight Example 4 |
|---|---|
| PVC plastisol base compound | 90 |
| crosslinking copolymer (3) | 1.75 |
| TMPTMA | 3.25 |
| t-butyl perbenzoate | 0.5 |

Note: (3) The crosslinking copolymer utilized in Example 4 corresponds to a compound having the structural formula identified above for Examples 1-3.

Adhesion results obtained with the cured coating adhesion were generally not as good as Example 1 (good adhesion at less than 13 mil thickness), but still better than typical results for formulations containing 50% by weight of only TMPTMA.

EXAMPLES 5 AND 6

Modified plastisol compositions the same as Example 1 were prepared, except t-amylperbanzoate (available from Atochem North America) was utilized as the free radical generating compound.

Adhesion results for the cured modified plastisol compositions were somewhat less favorable than those initiated with t-butyl perbenzoate. A 12 mil coating to metal for Examples 5 and 6 compared to less than 10 mil for Examples 2 and 3 when tested by standard test methods.

EXAMPLE 7

A modified plastisol composition was prepared by the same methods as Example 1, except ethylene glycol dimethacrylate was added in addition to TMPTMA monomer, as set forth in Table 3 below:

TABLE 3

| Component | Wt. % |
|---|---|
| PVC plastisol base compound | 90 |

TABLE 3-continued

| Component | Wt. % |
| --- | --- |
| crosslinking copolymer (4) | 3.5 |
| TMPTMA | 1.5 |
| EGDMA | 5.0 |
| t-butyl perbenzoate | 0.5 |

Note: (4) The crosslinking copolymer utilized in Example 7 corresponds to a compound having the structural formula identified above for Examples 1-3.

The modified plastisol composition of Example 7 was applied to ED-11 electrocoated steel substrate using the drawdown method with a wire would Myer rod. The thickness of one edge of the substrate was built up with masking tape in order to get a coating thickness gradient of 5-15 mil across the substrate when the drawdown is made. Coated substrates were placed in a vented, forced air drying oven at 325° F. (163° C.) for 2 minutes. Cured coated substrates exibited good coating to metal adhesion at slightly more than 10 mil coating thickness. The cured coating appeared to be smoother and wetted the substrate better than Examples 1-3 and slightly better than coatings containing TMPTMA monomer alone.

EXAMPLE 8

A modified plastisol composition the same as Example 7 was prepared except that 1,3 butylene glycol dimethacrylate was used in place of ethylene glycol dimethacrylate in the formulation. The cured coated substrates exhibited good coating to metal adhesion of about 10 mil coating thickness. The cured coating again appeared smoother and wetted the substrate better than Examples 1-3 and formulating containing TMPTMA monomer alone, but not as good as Example 7.

Other embodiments of the invention will be apparent to those skilled in the art from a consideration of this specification or practice of the invention disclosed herein. It is intended that the specification and examples be considered as exemplary only, with the true scope and spirit of the invention being indicated in the following claims.

What is claimed is:

1. A free radical-curable, modified plastisol composition, comprising:
   (a) a plastisol comprising a vinyl chloride polymer and a suitable plasticizer for said polymer;
   (b) a cure-effective amount of a free radical generating compound;
   (c) a crosslinking-effective amount of a partial ester of a free anhydride-containing, terminally ethylenically unsaturated, crosslinking copolymer, corresponding to the structural formula:

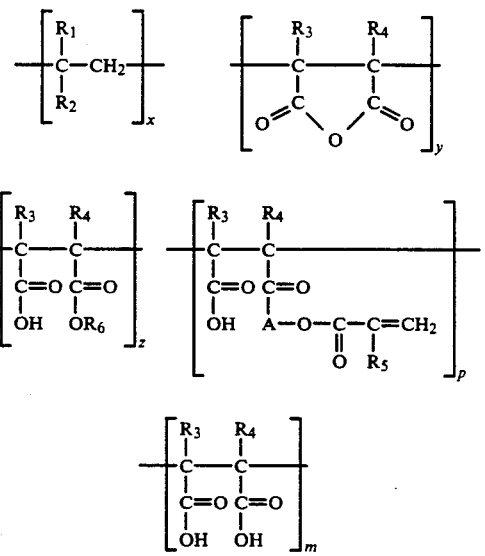

wherein: $R_1$ and $R_2$ may be the same or different and each may independently be selected from a member of the group consisting of hydrogen, alkyl containing from 1 to 20 carbon atoms, aryl containing from 6 to 10 carbon atoms, alkaryl containing from 7 to 14 carbon atoms, cycloalkyl containing from 4 to 12 carbon atoms, and a halogen radical; $R_3$, $R_4$ and $R_5$ each may be the same or different and each may be independently selected from a member of the group consisting of hydrogen, and an alkyl radical containing from 1 to 5 carbon atoms; the radical $R_6$ is a member selected from the group consisting of an alkyl, arylalkyl, alkyl-substituted arylalkyl and oxyalkylated derivatives of each of such radicals containing from 2 to 4 carbon atoms in each oxyalkylene group, which group may be of 1 to 20 repeating units; the radical A is a linear or branched divalent aklylene of from 1 to 20 carbon atoms, or an oxyalkylated derivative thereof containing from 2 to 4 carbon atoms in each oxyalkylene group, which group may be of 1 to 20 repeating units, and subscripts x, y, z,

TABLE 4

TABULATED DATA

| Example No. | Control | 1 | 2 | 3 | 4 | 5 | 6 | 7 | 8 |
| --- | --- | --- | --- | --- | --- | --- | --- | --- | --- |
| Formulation | | | | | | | | | |
| PVD plastisol base compound | 90 | 90 | 90 | 90 | 90 | 90 | 90 | 90 | 90 |
| Crosslinking Copolymer | — | 3.5 | 4.2 | 5.1 | 1.75 | 3.5 | 4.2 | 3.5 | 3.5 |
| TMPTMA (1) | 10.0 | 6.5 | 5.8 | 4.9 | 3.25 | 6.5 | 5.8 | 1.5 | 1.5 |
| t-butyl perbenzoate (2) | — | 0.5 | 0.5 | 0.5 | 0.5 | — | — | 0.5 | 0.5 |
| t-amyl perbenzoate | — | — | — | — | — | 0.5 | 0.5 | — | — |
| EGDMA (3) | — | — | — | — | — | — | — | 5.0 | — |
| 1,3BGDMA (4) | — | — | — | — | — | — | — | — | 5.0 |
| Inches Adhesion | .014 | .012 | .010 | <.010 | <.013 | .012 | .012 | .010-.011 | .010-.011 |
| Appearance (1 smoothest/best) | — | 3 | — | 4 | — | — | — | 1 | 2 |

(1) TMPTMA corresponds to trimethylolpropane trimethyacrylate available as SR-350 from Sartomer Company, Inc., Exton, Pa.
(2) Available as t-butyl perbenzoate from Atochem North America, King of Prussia, Pa.
(3) Ethylene glycol dimethacrylate is available as SR-206 from Sartomer Company, Inc., Exton, Pa.
(4) 1,3 butylene glycol dimethacrylate is available as SR-297 from Sartomer Company, Inc., Exton, Pa.

m and p are each whole numbers such that the sum of x, y, z, m and p may range from 3 to about 20, with x, p and y each being equal to or greater than 1, and m and z each may be zero.

2. The composition of claim 1, wherein said crosslinking copolymer has a number average molecular weight of between about 1,000 and about 20,000.

3. The composition of claim 2, wherein said crosslinking copolymer has a number average molecular weight of between about 2,000 and about 4,000.

4. The composition of claim 1, wherein said crosslinking copolymer has an acrylate equivalent per gram value of at least about 0.1.

5. The composition of claim 4, wherein said crosslinking copolymer has an acrylate equivalent per gram value of about 1 to about 2.

6. The composition of claim 1, wherein the acid number of said crosslinking copolymer is at least about 40.

7. The composition of claim 6, wherein the acid number of said crosslinking copolymer is between about 100 and about 300.

8. The composition of claim 1, wherein said crosslinking copolymer has a number average molecular weight of between about 1,000 and about 20,000, an acid number of at least about 40, and an acrylate equivalent per gram value of at least about 0.1.

9. The composition of claim 8, wherein said crosslinking copolymer has a number average molecular weight of between about 2,000 and about 4,000, an acid number of between about 100 and about 300, and an acrylate equivalent per gram value of about 1 to about 2.

10. The composition of claim 1, wherein $R_1$ and $R_2$ may be the same or different and each may independently be selected from a member of the group consisting of hydrogen, methyl, phenyl, benzyl, and cycloalkyl of 4 to 6 carbon atoms.

11. The composition of claim 1, wherein $R_3$, $R_4$ and $R_5$ may be the same or different and each may independently be selected from a member of the group consisting of hydrogen and methyl.

12. The composition of claim 1, wherein said oxyalkylated derivative comprising $R_6$ has 1 to 6 repeating oxyalkylene groups.

13. The composition of claim 1, wherein said oxyalkylated derivative comprising A has 1 to 6 repeating oxyalkylene groups.

14. The composition of claim 1, wherein in said formula, $R_1$ and $R_2$ are each the same or different and each are independently selected from a member of the group consisting of hydrogen, methyl, phenyl, and benzyl; $R_3$, $R_4$ and $R_5$ are each the same or different and each are independently selected from the group consisting of hydrogen and methyl; $R_6$ is selected from a member of the group consisting of hydrogen and an alkyl radical containing from 1 to 6 carbon atoms; and A is an alkylene hydrocarbon chain containing from 2 to 4 carbon atoms.

15. The composition of claim 14, wherein in said formula, $R_1$ is hydrogen; $R_2$ is phenyl; $R_3$ and $R_4$ are each hydrogen; $R_5$ is methyl; and A is an alkylene hydrocarbon chain containing 2 carbon atoms.

16. The composition of claim 14, wherein, in said formula, $R_1$ is hydrogen; $R_2$ is phenyl; $R_3$ and $R_4$ are each hydrogen; $R_5$ is methyl; and A is an alkylene hydrocarbon chain containing 2 carbon atoms.

17. The composition of claim 14, wherein, in said formula, $R_1$ is hydrogen; $R_2$ is phenyl; $R_3$ and $R_4$ are each hydrogen; $R_5$ is methyl; and $R_6$ is the residue of ethylene glycol butyl ether.

18. The composition of claim 1, wherein said vinyl chloride polymer is a homopolymer of vinyl chloride monomers.

19. The composition of claim 1, wherein said vinyl chloride polymer is a vinyl chloride copolymer.

20. The composition of claim 19, wherein said vinyl chloride copolymer further comprises a monomer selected from the group consisting of maleio anhydride, vinyl alcohol, vinyl acetate, acrylic acid, methacrylic acid, and acrylic esters of $C_2$ to $C_{10}$ aliphatic alcohols.

21. The composition of claim 19, wherein said vinyl chloride copolymer contains a major amount of vinyl chloride monomeric residues.

22. The composition of claim 1, wherein said plastisol component comprises from about 5% to about 95% by weight of a suitable plasticizer.

23. The composition of claim 1, wherein said suitable plasticizer is selected from a member of the group consisting of esters of phthalic, adipic, sebacic, azelaic, citric and phosphoric acids; chloro-hydrocarbons; esters of long chain alcohols; liquid polyesters; and epoxidized natural oils.

24. The composition of claim 1, wherein said free radical generating compound is an organic peroxide.

25. The composition of claim 24, wherein said organic peroxide is a tertiary alkyl perbenzoate compound.

26. The composition of claim 25, wherein said tertiary alkyl perbenzoate compound is t-butyl perbenzoate.

27. The composition of claim 25, wherein said tertiary alkyl perbenzoate compound is t-amyl perbenzoate.

28. The composition of claim 1, wherein said plastisol is present in an amount of from about 99% to about 50% by weight based on the total weight of said free radical curable modified plastisol composition.

29. The composition of claim 28, wherein said plastisol is present in an amount of from about 95% to about 75% by weight based on the total weight of said free radical curable modified plastisol composition.

30. The composition of claim 1, wherein said vinyl chloride polymer is present in an amount of from about 95% to about 5% by weight based o the total weight of said plastisol component.

31. The composition of claim 30, wherein said vinyl chloride polymer is present in an amount of from about 45% to about 30% by weight based on the total weight of said plastisol component.

32. The composition of claim 1, wherein said free radical generating compound is present in an amount of from about 0.01% to about 10% by weight based on the total weight of said free radical curable modified plastisol composition.

33. The composition of claim 32, wherein said free radical generating compound is present in an amount of from about 0.1% to about 1% by weight based on the total weight of said free radical curable modified plastisol composition.

34. The composition of claim 1, wherein said crosslinking copolymer is present in an amount of from about 50% to about 1% by weight based on the total weight of said free radical curable modified plastisol composition.

35. The composition of claim 1, wherein said crosslinking copolymer is present in an amount of from about 10% to about 1% by weight based on the total weight of said free radical curable modified plastisol composition.

36. The composition of claim 1 or 14, wherein in said formula, the subscript z is zero.

37. The composition of claims 1 or 14, wherein in said formula, the subscripts Z and M are zero.

38. The composition of claims 1 or 14, wherein in said formula, the subscript M is zero.

39. The composition of claim 1, wherein said crosslinking copolymer is a styrene/maleic anhydride copolymer having a mole ratio of styrene to maleic anhydride of 1:1 to about 4:1.

40. A cured plastisol composition provided by curing the composition of claims 1 or 14.

41. A free radical curable modified plastisol composition, comprising:
    (a) a plastisol comprising a vinyl chloride polymer and a suitable plasticizer for said polymer;
    (b) a cure-effective amount of a free radical generating compound;
    (c) a crosslinking-effective amount of a partial ester of a free anhydride-containing, terminally ethylencially unsaturated crosslinking copolymer, corresponding to the structural formula:

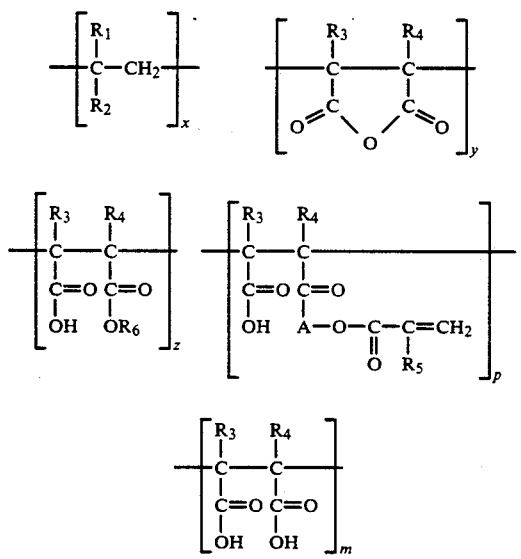

wherein: $R_1$ and $R_2$ may be the same or different and each may be independently selected from a member of the group consisting of hydrogen, alkyl containing from 1 to 20 carbon atoms, aryl containing from 6 to 10 carbon atoms, alkaryl containing from 7 to 14 carbon atoms, cycloalkyl containing from 4 to 12 carbon atoms, and a halogen radical; $R_3$, $R_4$ and $R_5$ each may be the same or different and each may be independently selected from a member of the group consisting of hydrogen, and an alkyl radical containing from 1 to 5 carbon atoms; the radical $R_6$ is a member selected from the group consisting of an alkyl, arylalkyl, alkyl-substituted arylalkyl and oxyalkylated derivatives of each of such radicals containing from 2 to 4 carbon atoms in each oxyalkylene group, which group may be of 1 to 20 repeating units; the radical A is a linear or branched divalent alkylene of from 1 to 20 carbon atoms, or an oxyalkylated derivative thereof containing from 2 to 4 carbon atoms in each oxyalkylene group, which group may be of 1 to 20 repeating units, and subscripts x, y, z, m and p are each whole numbers such that the sum of x, y, z, m and p may range from 3 to about 20, with x, p and y each being equal to or greater than 1, and m and z each may be zero; and (d) a free radical polymerizable reactive diluent present in an amount sufficient to form a liquid dispersion of said crosslinking copolymer.

42. The composition of claim 41, wherein said reactive diluent is present in an amount of about 1% to about 10% by weight of the total free radical-curable modified plastisol composition.

43. The composition of claim 41, wherein said reactive diluent contains at least one methacrylate compound.

44. The composition of claim 41, wherein said reactive diluent contains at least one monoacrylate compound.

45. The composition of claim 41, wherein said reactive diluent contains at least one multi-functional methacrylate compound.

46. The composition of claim 41, wherein said reactive diluent contains at least one multi-functional acrylate compound.

47. The composition of claim 45, wherein said multi-functional methacrylate compound comprises trimethylolpropane trimethacrylate.

48. The composition of claim 45, wherein said multi-functional methacrylate compound comprises ethylene glycol dimethacrylate.

49. The composition of claim 45, wherein said multi-functional methacrylate compound comprises 1,3-butylene glycol dimethacrylate.

50. The composition of claim 45, wherein said multi-functional methacrylate compound comprises an admixture of ethylene glycol dimethacrylate and trimethylolpropane trimethacrylate.

51. The composition of claim 45, wherein said multi-functional methacrylate compound comprises an admixture of 1,3butylene glycol dimethacrylate and trimethylolpropane trimethacrylate.

52. The composition of claim 41, wherein in said structural formula of said crosslinking copolymer $R_1$ and $R_2$ are each the same or different and each are independently selected from a member of the group consisting of hydrogen, methyl, phenyl, and benzyl; $R_3$, $R_4$ and $R_5$ are each the same or different and each are independently selected from the group consisting of hydrogen and methyl; $R_6$ is selected from a member of the group consisting of hydrogen and an alkyl radical containing from 1 to 6 carbon atoms; and A is an alkylene hydrocarbon chain containing from 2 to 4 carbon atoms.

53. A cured plastisol composition provided by curing the composition of claim 41.

54. A method of providing a cured plastisol composition by thermally curing a composition comprising:
    (a) a plastisol comprising a vinyl chloride polymer and a suitable plasticizer for said polymer;
    (b) a cure-effective amount of a free radical generating compound;
    (c) a crosslinking-effective amount of a partial ester of a free anhydride-containing, terminally ethylenically unsaturated, crosslinking copolymer corresponding to the structural formula:

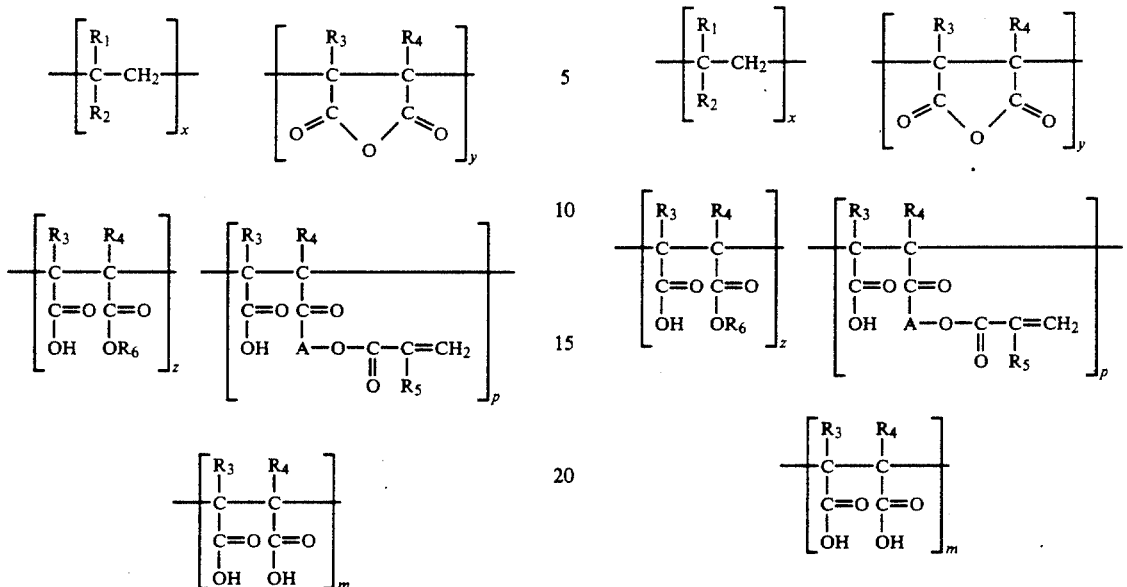

wherein: $R_1$ and $R_2$ may be the same or different and each may be independently selected from a member of the group consisting of hydrogen, alkyl containing from 1 to 20 carbon atoms, aryl containing from 6 to 10 carbon atoms, alkaryl containing from 7 to 14 carbon atoms, cycloalkyl containing from 4 to 12 carbon atoms, and a halogen radical; $R_3$, $R_4$ and $R_5$ each may be the same or different and each may be independently selected from a member of the group consisting of hydrogen, and an alkyl radical containing from 1 to 5 carbon atoms; the radical R: is a member selected from the group consisting of an alkyl, arylalkyl, alkyl-substituted arylalkyl and oxyalkylated derivatives of each of such radicals containing from 2 to 4 carbon atoms in each oxyalkylene group, which group may be of 1 to 20 repeating units; the radical A is a linear or branched divalent alkylene of from 1 to 20 carbon atoms, or an oxyalkylated derivative thereof containing from 2 to 4 carbon atoms in each oxyalkylene group, which group may be of 1 to 20 repeating units, and subscripts x, y, z, m and p are each whole numbers such that the sum of x, y, z, m and p may range from 3 to about 20, with x, p and y each being equal to or greater than 1, and m and z each may be zero.

55. A method of providing a cured plastisol composition by thermally curing a composition comprising:

(a) a plastisol comprising a vinyl chloride polymer and a suitable plasticizer for said polymer;

(b) a cure-effective amount of a free radical generating compound;

(c) a crosslinking-effective amount of a partial ester of a free anhydride-containing, terminally ethylenically unsaturated, crosslinking copolymer corresponding to the structural formula:

wherein: $R_1$ and $R_2$ may be the same or different and each may independently be selected from a member of the group consisting of hydrogen, alkyl containing from 1 to 20 carbon atoms, aryl containing from 6 to 10 carbon atoms, alkaryl containing from 7 to 14 carbon atoms, cycloalkyl containing from 4 to 12 carbon atoms, and a halogen radical; $R_3$, $R_4$ and $R_5$ each may be the same or different and each may independently be selected from a member of the group consisting of hydrogen, and an alkyl radical containing from 1 to 5 carbon atoms; the radical $R_6$ is a member selected from the group consisting of an alkyl, arylalkyl, alkyl-substituted arylalkyl and oxyalkylated derivatives of each of such radicals containing from 2 to 4 carbon atoms in each oxyalkylene group, which group may be of 1 to 20 repeating units; the radical A is a linear or branched divalent alkylene of from 1 to 20 carbon atoms, or an oxyalkylated derivative thereof containing from 2 to 4 carbon atoms in each oxyalkylene group, which group may be of 1 to 20 repeating units, and subscripts x, y, z, m and p are each whole numbers such that the sum of x, y, z, m and p may range from 3 to about 20, with x, p and y each being equal to or greater than 1, and m and z each may be zero; and (d) a free radical polymerizable reactive diluent present in an amount sufficient to form a liquid dispersion of said crosslinking copolymer.

56. The composition of claim 41, wherein in said structural formula of said crosslinking copolymer $R_1$ is hydrogen; $R_2$ is phenyl; $R_3$ and $R_4$ are each hydrogen; $R_5$ is methyl; and A is an alkylene hydrocarbon chain containing 2 carbon atoms.

57. The composition of claim 41, wherein in said structural formula of said crosslinking copolymer $R_1$ is hydrogen; $R_2$ is phenyl; $R_3$ and $R_4$ are each hydrogen; $R_5$ is methyl; and A is an alkylene hydrocarbon chain containing 2 carbon atoms.

58. The composition of claim 41, wherein in said structural formula of said crosslinking copolymer $R_1$ is hydrogen; $R_2$ is phenyl; $R_3$ and $R_4$ are each hydrogen; $R_5$ is methyl; and $R_6$ is the residue of ethylene glycol butyl ether.

* * * * *